US006403040B1

(12) United States Patent
Sasakura et al.

(10) Patent No.: US 6,403,040 B1
(45) Date of Patent: Jun. 11, 2002

(54) IONIZER

(75) Inventors: Akira Sasakura, Nabari; Yasuo Mizokoshi, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/764,642

(22) Filed: Jan. 17, 2001

(30) Foreign Application Priority Data

Jan. 17, 2000 (JP) ....................................... 2000-007488

(51) Int. Cl.[7] ................................................. B01J 19/08

(52) U.S. Cl. ................... 422/186.04; 361/213; 361/220

(58) Field of Search ..................... 422/186.04; 361/213, 361/220

(56) References Cited

U.S. PATENT DOCUMENTS 5,949,635 A * 9/1999 Botez ......................... 361/213

FOREIGN PATENT DOCUMENTS

JP 5-114496 5/1993

* cited by examiner

*Primary Examiner*—Kishor Mayekar
(74) *Attorney, Agent, or Firm*—Dike, Bronstein, Roberts & Cushman IP Group Edwards & Angell, LLP; David G. Conlin; David A. Tucker

(57) ABSTRACT

The main object of the present invention is to provide an ionizer that has been improved to allow reduction of ripples and of balance shift without degrading the capability of an ionizer. A grounded ground electrode that makes contact with the ions for capturing a portion of the ions is provided in the vicinity of a discharge electrode. Means for changing the area of contact between ground electrode and the ions is provided.

6 Claims, 4 Drawing Sheets

IONIZER

BACKGROUND OF THE INVENTION

1. Field of the Invention

The present invention is generally related to an ionizer for removing electric charges, and more specifically to an ionizer that has been improved to allow reduction of ripples and of balance shift without degrading the capability as an ionizer.

2. Description of the Background Art

FIG. 5 is a concept diagram of a conventional ionizer. The ionizer has a main body 1. Main body 1 is provided with a plurality of acicular electrodes 2. Main body 1 normally is provided with a grounded metallic cover (not shown). The ionizer is used for the purpose of removing electric charges. During the manufacturing process of a semiconductor device, static electricity is generated on a substrate 3. If the static electricity is not removed, the device could be destroyed, or particulate dust may adhere to the semiconductor device so that the yield is reduced, which leads to lower productivity. In order to solve this problem, an ionizer blows an ionic substance against substrate 3, the target of electric charge removal, to remove the electric charge.

Most of the conventional ionizers is of the type that generates ions by applying a high direct current or alternating current voltage to an acicular electrode 2 or to a thin metal line electrode and generating corona discharge in the vicinity of electrode 2 to ionize the atmosphere. Most ionizers create corona discharge constantly regardless of the surrounding environment. Thus, a grounded electrode having an unchanging area of contact with the ions is provided in the vicinity of discharge electrode 2. Such an electrode is referred to as a ground electrode, and is conventionally and in many cases formed integrally with the metallic cover.

Broadly, the use of a conventional ionizer for removal of electric charges involves the two following problems.

One problem is as follows. An ionizer 10 as shown in FIG. 5 normally generates positive ions and negative ions, and when a high alternating current voltage as shown in FIG. 6A is applied to discharge electrode 2, the surface potential of substrate 3 varies according to the application of the high voltage to discharge electrode 2 due to the ions that arrive at substrate 3 which is the target object of electric charge removal and to the induction by discharge electrode 2 that has attained the high voltage level.

Alternate application of positive ions and negative ions causes the surface potential of substrate 3 to vary in the form of waves as shown in FIG. 6B. This wave-like surface potential displacement will be hereinafter referred to as ripples.

In particular, in the case where ionizer 10 having high capability is used, the ripples are small if the electrostatic capacity of the target object of electric charge removal (i.e. the substrate) is large. If the electrostatic capacity of the target object of electric charge removal is small, however, the ripples would create a surface potential variation of ±several 100 volts. This can be easily seen from the relation of Q=CV (Q: electric charge, C: electrostatic capacity, V: potential difference).

Even when the electrostatic capacity of the target object of electric charge removal (substrate 3) is the same, the ripples are small in the case in which substrate 3 makes contact with a ground as shown in FIG. 7A since electrostatic capacity is large. On the other hand, when substrate 3 or the target object of electric charge removal is raised from the ground as shown in FIG. 7B, the electrostatic capacity becomes small and the ripples extremely large. When the ripples become large, i. e. when surface potential displacement becomes large, such that a discharge or the like occurs, the device is destroyed, which results in reduction of the yield.

In this manner, when the charged amount of the target object of electric charge removal is small, and when the amount of ripple variation is great, the surface potential can increase more than the initial charged amount.

Another problem is that, when an ionizer is used continuously, the balance of discharge of the positive ions and the negative ions is destroyed (a condition hereinafter referred to as "balance shift") due to the degradation of discharge electrodes 2 or the adhesion of foreign substance to discharge electrodes 2. The continued use of the ionizer with its balance of discharge destroyed would result in reversely charging the target object of electric charge removal positively or negatively, as shown in FIG. 8. In other words, while the dotted line should be at 0 volt, the ripple curve may undergo parallel translation upward, i.e. the target object of electric charge removal may be reversely charged, for instance by 100 V, toward the positive side. In particular, in the case of an ionizer having high ion generation capability, large surface potential will be generated when the electrostatic capacity of the target object of electric charge removal that has been reversely charged due to this loss of balance becomes small. When large surface potential is created on the target object of electric charge removal, thereby causing a discharge and the like, the device could be destroyed, or particles may adhere to the semiconductor device, which leads to the problem of reduced yield.

SUMMARY OF THE INVENTION

The present invention is made to solve the above-described problems, and its object is to provide an ionizer that has been improved to allow reduction of ripples and of balance shift without degrading the capability as an ionizer.

According to the first aspect of the present invention, an ionizer has a main body. A discharge electrode for generating ions by creating corona discharge with high voltage application is mounted on the main body. A grounded ground electrode that makes contact with the ions for absorbing a portion of the ions is provided in the vicinity of the discharge electrode. The ionizer is provided with an element for changing the area of contact between the ground electrode and the ions.

Since the element for changing the area of contact between the ground electrode and the ions is provided according to the present invention, the area of the ground electrode can be changed so as to effect adjustment to reduce ripples and balance shift while limiting the degradation of the capability of an ionizer as much as possible.

According to the second aspect of the present invention, the ionizer is further provided with an element for changing the distance between the ground electrode and the discharge electrode.

Since the element for changing the distance between the ground electrode and the discharge electrode is provided according to the present invention, the amount of a portion of ions to be absorbed by the ground electrode can be adjusted.

According to the third aspect of the present invention, the ionizer is further provided with an element for moving and fixing the ground electrode.

In the ionizer according to the fourth aspect of the present invention, the element for moving and fixing the ground electrode includes a bolt erected on the main body and an elongate hole being provided in the ground electrode and extending in the up-down direction or in the right-to-left direction. The bolt engages the elongate hole, thereby fixing the ground electrode to the main body such that the ground electrode is movable in the up-down direction or in the right-to-left direction.

Since the ground electrode is fixed such that it is movable in the up-down direction or in the right-to-left direction, the area of contact between the ground electrode and the ions can be changed.

In the ionizer according to the fifth aspect of the present invention, between the ground electrode and the main body, a spacer is provided for changing the distance between the ground electrode and the discharge electrode.

According to the present invention, the provision of a spacer allows changing of the distance between the ground electrode and the discharge electrode.

In the ionizer according to the sixth aspect of the present invention, a cover for covering the main body is provided to the main body. The ground electrode is fixed to the main body with the cover existing therebetween.

According to the present invention, a conventional ionizer itself can be utilized with the ground electrode fixed to the main body of the conventional ionizer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be described below with reference to the drawings.

First Embodiment

Figure 1:
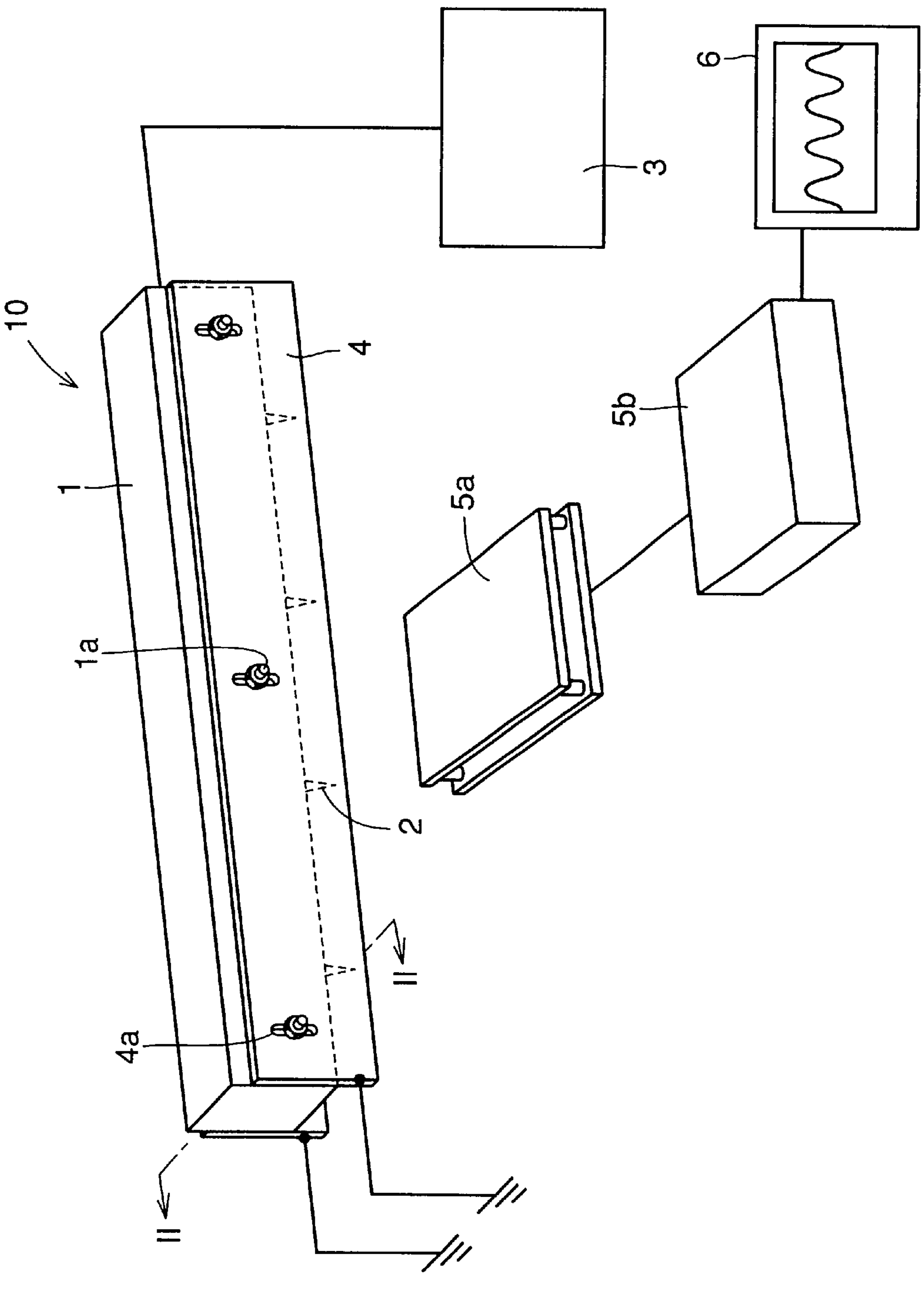
FIG. 1 is a concept diagram of an ionizer according to a first embodiment.

FIG. 1 is a concept diagram of an ionizer according to the first embodiment. Although this embodiment employs as an example of an ionizer the type in which a high alternating current voltage is applied to a plurality of acicular discharge electrodes, the present invention is not so limited and may include types in which a high direct current voltage is applied or types employing a discharge electrode made of a thin line.

As shown in FIG. 1, ionizer 10 has a main body 1. A plurality of acicular discharge electrodes 2 are provided to main body 1. A high voltage power source 3 applies a voltage of ±several kV or greater in alternating current to discharge electrodes 2 to generate corona discharge. A grounded conductive plate 4 serving as a ground electrode is provided to a side surface of main body 1. Here, conductive plate 4 is formed of stainless steel, but any other metal may be used. An elongate hole 4*a* is provided in conductive plate 4. A bolt 1*a* is erected on main body 1. Bolt 1*a* is fixed to the opening of elongate hole 4*a* such that it may be moved upward and downward. For simplicity of description, the mounting method of conductive plate 4 as shown is illustrated. Any other mounting method may be employed, however, if the method allows up and down movement or right-to-left movement followed by fixing of conductive plate 4.

The amount of ion absorption can be adjusted by moving the mounting position of conductive plate 4 upward or downward. As one example, an electrostatic plate and the like generally employed may be used for the measurement of the electric charge removal capability and ripples. The diagram shows the type having both a plate 5*a* for receiving the ions and a control portion 5*b* that allows application of a constant voltage to plate 5*a* and that can measure the surface potential of plate 5*a*. The measured surface potential may be taken into a recording instrument 6 such as an oscilloscope to allow visual display of the time required for electric charge removal and ripples.

Figure 2:
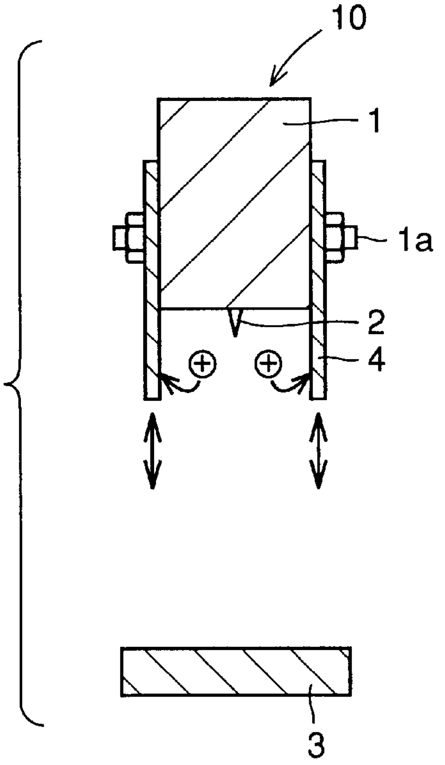
FIG. 2 is a cross sectional view taken along a line II—II in FIG. 1.

Now the operation will be described. FIG. 2 is a cross sectional view taken along the line II—II in FIG. 1.

Referring to FIG. 2, when a high voltage is applied, a discharge electrode 2 generates corona discharge that ionizes the atmosphere in the vicinity of the electrode. The ions reach the target object of electric charge removal via the surrounding airflow or an electric field. When a grounded electrode 4 exists between ionizer 10 and target object of electric charge removal 3, part of the ions does not reach target object of electric charge removal 3 but is absorbed by ground electrode 4. The amount of ion absorption becomes greater as the distance between ground electrode 4 and discharge electrode 2 gets smaller, or as the contact area between ground electrode 4 and the ions increases. As the amount of ion absorption becomes greater, ripples and the amount of balance shift are reduced. On the other hand, the capability of electric charge removal is lowered. Consequently, by making variable and thereby adjusting the contact area between ground electrode 4 and the ions, ripples and the amount of balance shift can be reduced while limiting the degradation of the electric charge removal capability required of an ionizer. The results are indicated in Table 1.

TABLE 1

Effects of ground electrode

| | | Ripple width (V) | Time required for removal of positive ions (msec) | Time required for removal of negative ions (msec) | Amount of shift (V) |
|---|---|---|---|---|---|
| First comparative example | Initial state | 200 | 145 | 148 | 230 |
| First example | Extending GND downward by 10 mm | 80 | 270 | 289 | 87 |

TABLE 1-continued

Effects of ground electrode

| | | Ripple width (V) | Time required for removal of positive ions (msec) | Time required for removal of negative ions (msec) | Amount of shift (V) |
|---|---|---|---|---|---|
| Second example | Extending GND downward by 5 mm | 125 | 192 | 203 | 145 |

In Table 1, first comparative example indicates the initial state where ground electrode 4 is not mounted to the main body. The ripple width is as great as 200 V. The amount of shift is as great as 230 V. On the other hand, the first example indicates the case where ground electrode 4 (GND) is extended downward or toward the target object of electric charge removal by 10 mm, and the ripple width and the amount of shift are reduced in comparison with the initial state. Moreover, as it is clearly seen from the second example, the ripple width and the amount of shift are reduced in comparison with the initial state when GND is extended downward or toward the target object of electric charge removal by 5 mm.

As to the time required for removal of positive ions and the time required for removal of negative ions, the first example exhibits the best results. Both the first example and the second example show longer removal times than those of the first comparative example.

Moreover, the instrument for measuring the time of electric charge removal and the ripples of the ionizer is not limited to that described above, but may be any type of measuring instrument. Using an appropriate measuring instrument, the position of conductive plate 4 that serves as the ground electrode is determined such that the optimal combination condition concerning the electric charge removal capacity, ripples, and the balance shift is derived. In addition, once the optimal position of conductive plate 4 is determined and no further moving of conductive plate 4 is required, elongate hole 4*a* of conductive plate 4 may be changed to a circular hole and used.

Second Embodiment

Figure 3:
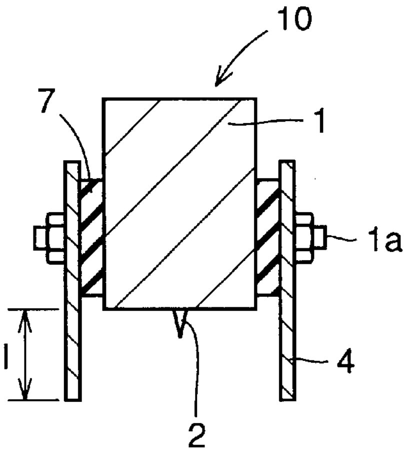
FIG. 3 is a cross sectional view of an ionizer according to a second embodiment.

FIG. 3 is a cross sectional view of an ionizer according to the second embodiment. In FIG. 3, the same or corresponding parts found in the apparatus of FIG. 1 are denoted by the same reference characters, and the descriptions thereof will not be repeated.

The apparatus of FIG. 3 differs from the apparatus of FIG. 1 in that, between main body 1 and conductive plate 4, a spacer 7 is provided which can make the distance between discharge electrode 2 and conductive plate 4 variable.

The amount of ions absorbed by ground electrode 4 is greater when the distance between ground electrode 4 and discharge electrode 2 is smaller. When the amount of ions absorbed by ground electrode 4 becomes greater, ripples and the amount of balance shift are reduced, while the electric charge removal capacity is lowered. According to this embodiment, by making variable and thereby adjusting the distance between discharge electrode 2 and ground electrode 4, ripples and the amount of balance shift can be reduced while limiting the degradation of the electric charge removal capability required.

Third Embodiment

Figure 4:
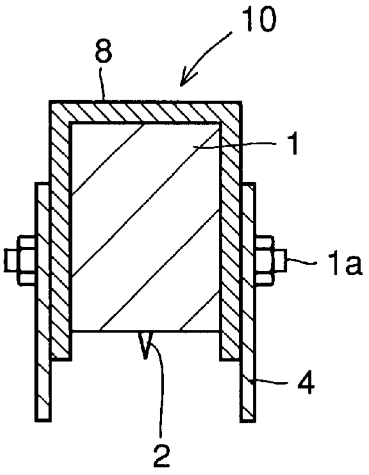
FIG. 4 is a cross sectional view of an ionizer according to a third embodiment.
Figure 5:
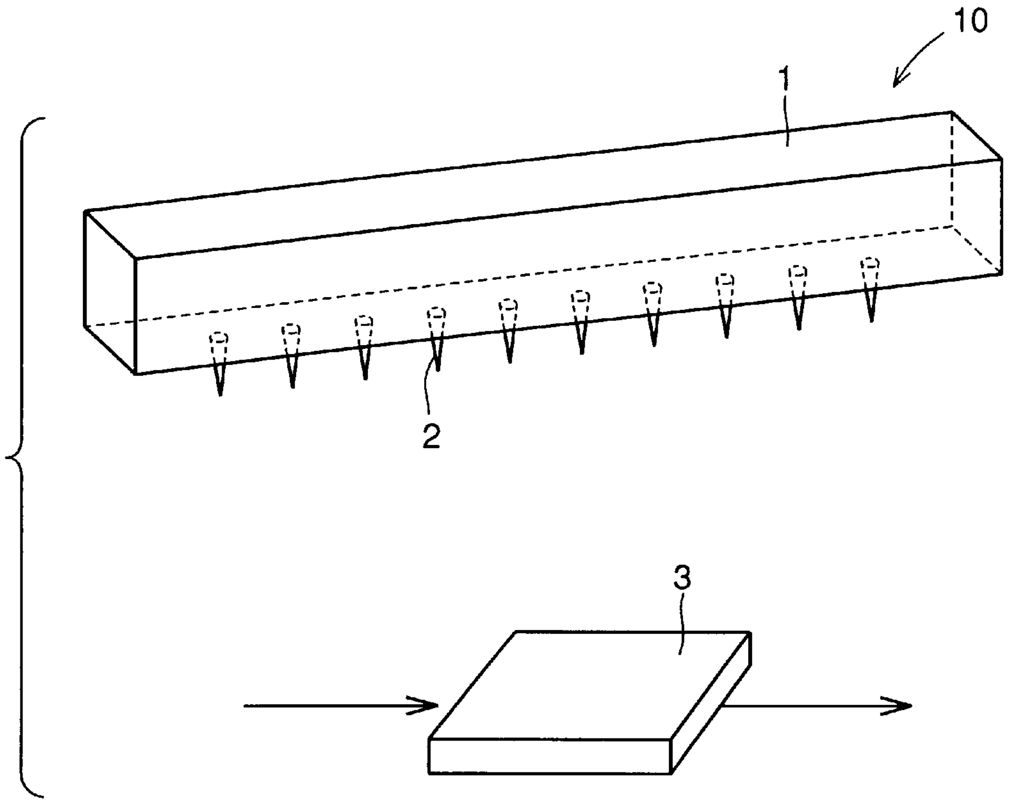
FIG. 5 PRIOR ART
FIG. 5 is a concept diagram of a conventional ionizer.
Figure 6A:
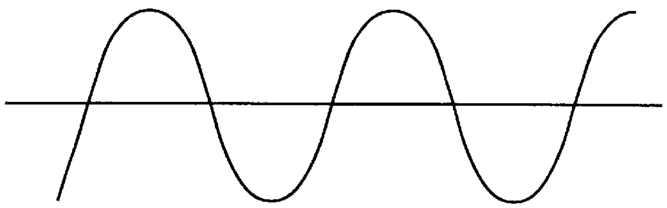
FIG. 6A PRIOR ART
FIGS. 6A and 6B are diagrams relating to the description of ripples of the conventional ionizer.
Figure 6B:
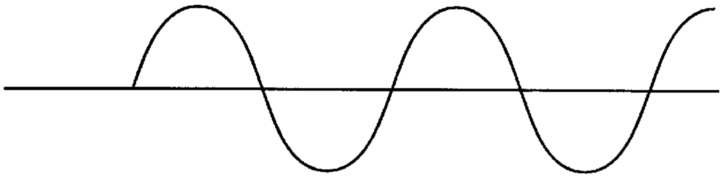
FIG. 6B PRIOR ART
Figure 7A:
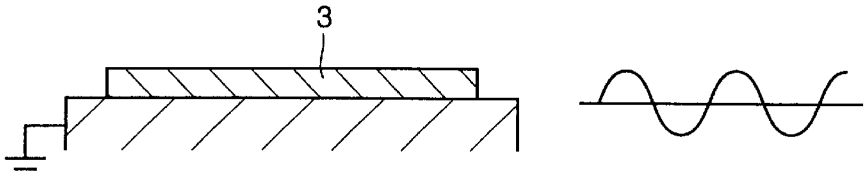
FIG. 7A PRIOR ART
FIGS. 7A and 7B are other diagrams relating to the description of ripples of the conventional ionizer
Figure 7B:
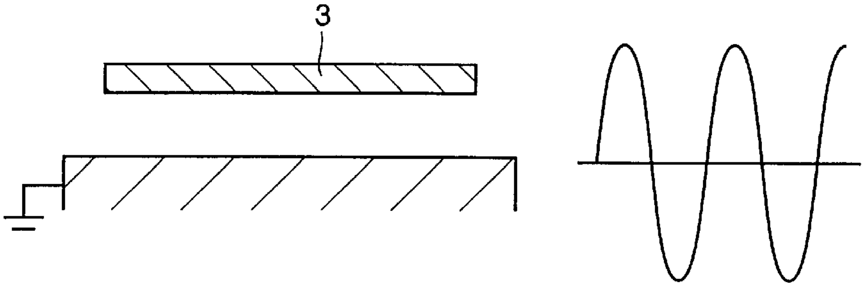
FIG. 7B PRIOR ART
Figure 8:
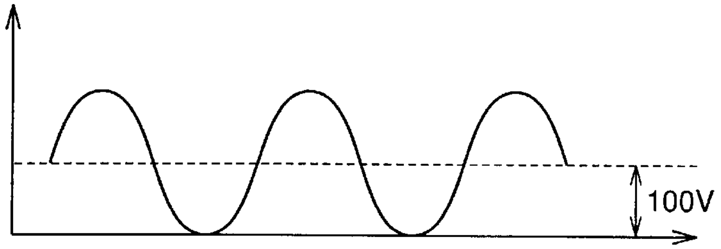
FIG. 8 PRIOR ART
FIG. 8 is a diagram relating to the description of balance shift of the conventional ionizer.

FIG. 4 is a cross sectional view of an ionizer according to the third embodiment. In FIG. 4, the same or corresponding parts found in the apparatus of FIG. 1 are denoted by the same reference characters, and the descriptions thereof will not be repeated.

In the apparatus of FIG. 4, a cover 8 is provided such that it covers main body 1. Ground electrodes 4 are provided to main body 1 with cover 8 existing therebetween. Main body 1 having cover 8 is a conventional ionizer. According to this embodiment, the conventional ionizer is provided with ground electrodes 4 so as to reduce ripples and the amount of balance shift while limiting the degradation of the electric charge removal capability required of an ionizer.

Moreover, although the above example illustrates the case relating to the manufacture of a semiconductor device, the ionizer according to the present invention may be utilized for any of the fields (for example, film, paper production, and automobile industries) requiring electric charge removal.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An ionizer, comprising:

a main body;

a discharge electrode mounted on said main body for generating ions by creating corona discharge with high voltage application;

a grounded ground electrode being provided in vicinity of said discharge electrode and adapted to make contact with said ions; and means for changing area of contact between said ground electrode and said ions.

2. The ionizer according to claim 1, further comprising:

means for changing distance between said ground electrode and said discharge electrode.

3. The ionizer according to claim 2, wherein a spacer is provided, between said ground electrode and said main body, for changing said distance between said ground electrode and said discharge electrode.

4. The ionizer according to claim 1, further comprising:

means for moving and fixing said ground electrode.

5. The ionizer according to claim 4, wherein said means for moving and fixing said ground electrode includes a bolt erected on said main body, and an elongate hole being provided in said ground electrode and extending in up-down direction or in right-to-left direction, and wherein said bolt engages said elongate hole, thereby fixing said ground electrode to said main body such that said ground electrode is movable in the up-down direction or in the right-to-left direction.

6. The ionizer according to claim 4, wherein a cover for covering said main body is provided to said main body, and said ground electrode is fixed to said main body with said cover existing therebetween.

* * * * *